US009118567B2

(12) United States Patent
Bisht et al.

(10) Patent No.: US 9,118,567 B2
(45) Date of Patent: Aug. 25, 2015

(54) REMOVING LEAD FILTER FROM SERIAL MULTIPLE-STAGE FILTER USED TO DETECT LARGE FLOWS IN ORDER TO PURGE FLOWS FOR PROLONGED OPERATION

(71) Applicant: TELEFONAKITIEBOLAGET L M ERICSSON (PUBL), Stockholm (SE)

(72) Inventors: Ashutosh Bisht, Bangalore (IN); Prashant Anand, Bangalore (IN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 57 days.

(21) Appl. No.: 13/942,566

(22) Filed: Jul. 15, 2013

(65) Prior Publication Data
US 2015/0016255 A1    Jan. 15, 2015

(51) Int. Cl.
*H04J 1/16*        (2006.01)
*H04L 12/801*      (2013.01)
*H04L 12/851*      (2013.01)
*H04L 12/26*       (2006.01)
*H04L 12/715*      (2013.01)
*H04L 12/803*      (2013.01)
(Continued)

(52) U.S. Cl.
CPC ............ *H04L 47/11* (2013.01); *H04L 43/022* (2013.01); *H04L 43/028* (2013.01); *H04L 43/06* (2013.01); *H04L 43/08* (2013.01); *H04L 45/64* (2013.01); *H04L 47/10* (2013.01); *H04L 47/12* (2013.01); *H04L 47/2441* (2013.01); *H04L 43/00* (2013.01); *H04L 45/00* (2013.01); *H04L 45/38* (2013.01); *H04L 47/125* (2013.01); *H04L 49/00* (2013.01)

(58) Field of Classification Search
None
See application file for complete search history.

(56) References Cited

U.S. PATENT DOCUMENTS 4,562,436 A * 12/1985 Coleman et al. ............... 340/2.1
7,061,970 B2 * 6/2006 Reed et al. .................... 375/148
(Continued)

FOREIGN PATENT DOCUMENTS

WO    WO-2008112505 A1    9/2008

OTHER PUBLICATIONS

Estan et al., "New Directions in Traffic Measurement and Accounting", pp. 323-336, SIGCOMM'02, Aug. 19-23, 2002, Pittsburgh, Pennsylvania, USA, Copyright 2002 ACM 1-58113-570-X/02/0008 . . . $5.00.
(Continued)

*Primary Examiner* — Bunjob Jaroenchonwanit
(74) *Attorney, Agent, or Firm* — Nicholson De Vos Webster & Elliott LLP

(57) ABSTRACT

A network device to detect large flows includes a card to receive packets of flows. The device includes a large flow detection module including a serial multiple-stage filter module including series filter modules including a lead filter module and a tail filter module. Each filter module includes counters. The serial filter module is to serially increment the counters to reflect the flows, and is to increment counters that correspond to flows of subsequent filter modules only after all counters that correspond to the flows of all prior filter modules have been incremented serially up to maximum values. The serial filter module is to detect flows that correspond to counters of the tail filter module that have been incremented up to maximum values as the large flows. The large flow detection module includes a lead filter removal module to remove the lead filter module from the start of the series.

22 Claims, 9 Drawing Sheets

(51) Int. Cl.
*H04L 12/721* (2013.01)
*H04L 12/931* (2013.01)
*H04L 12/701* (2013.01)

(56) References Cited

U.S. PATENT DOCUMENTS

| | | | | |
|---|---|---|---|---|
| 7,545,889 | B2* | 6/2009 | Li et al. | 375/332 |
| 7,555,661 | B2* | 6/2009 | Luu | 713/320 |
| 7,808,917 | B2* | 10/2010 | Barthel et al. | 370/242 |
| 7,894,358 | B2* | 2/2011 | Martin et al. | 370/252 |
| 8,068,422 | B2* | 11/2011 | Ronneke | 370/235 |
| 8,750,121 | B2 | 6/2014 | Allan | |
| 8,811,183 | B1* | 8/2014 | Anand et al. | 370/237 |
| 2002/0114273 | A1* | 8/2002 | Tobita et al. | 370/229 |
| 2004/0109411 | A1* | 6/2004 | Martin | 370/229 |
| 2008/0225740 | A1* | 9/2008 | Martin et al. | 370/252 |
| 2011/0085444 | A1* | 4/2011 | Ko et al. | 370/236 |
| 2013/0297798 | A1* | 11/2013 | Arisoylu et al. | 709/226 |
| 2014/0105218 | A1* | 4/2014 | Anand et al. | 370/412 |
| 2014/0169166 | A1* | 6/2014 | Anand et al. | 370/230.1 |
| 2014/0237118 | A1 | 8/2014 | Matthews | |
| 2014/0273901 | A1* | 9/2014 | Liu et al. | 455/226.1 |

OTHER PUBLICATIONS

Yi Lu et al., "Elephant Trap: A Low Cost Device for Identifying Large Flows", 1550-4794, $25.00, Copyright 2007, IEEE, DOI 10.1109/HOTI.2007.1, IEEE Computer Society, pp. 99-105.

Cisco's Netflow, http://www.cisco.com/en/US/products/ps6965/products_ios_protocol_option_home.html.

Christin, Nicolas et al., "Marking algorithms for service differentiation of TCP traffic", 2004, pp. 2058-2069, Computer Communications 28 (2005), Elsevier B.V.

Estan, Cristian et al., "New Directions in Traffic Measurement and Accounting: Focusing on the Elephants, Ignoring the Mice", Aug. 2003, pp. 270-313, ACM Transactions on Computer Systems, vol. 21, No. 3.

Peluso, L. et al., "Flow Selection Techniques, draft-ietf-ipfix-flow-selection-tech-01.txt", Mar. 6, 2010, 24 pages, Internet Engineering Task Force, Internet-Draft, IEFT Trust and the persons identified as the document authors.

* cited by examiner

Three Filters Coupled In Series Before Filter Removal And Addition

Three Filters Coupled In Series After Filter Removal And Addition

REMOVING LEAD FILTER FROM SERIAL MULTIPLE-STAGE FILTER USED TO DETECT LARGE FLOWS IN ORDER TO PURGE FLOWS FOR PROLONGED OPERATION

BACKGROUND

1. Field

Embodiments of the invention relate to the field of networking; and more specifically, to detecting large flows in networks.

2. Background Information

In many networks it is often the case that a small proportion of large flows use a disproportionately large proportion of the overall bandwidth and other network resources. These large flows are sometimes referred to as elephant flows or heavy hitter flows. Similarly, a large proportion of small flows often use only a small proportion of the overall bandwidth and other network resources. These small flows are sometimes referred to as mice flows. By way of example, in some networks, the largest 10% of the flows may use more than 80% of the bandwidth and other network resources.

It is often desirable to be able to identify or detect such large flows so that they may be handled differently than small flows, or for various other purposes associated with network monitoring, network management, or other purposes. As one example, the identified large flows may be used for billing and/or accounting (e.g., the large flows may be charged differently than the small flows). As another example, the identified large flows may be used for bandwidth management and/or traffic engineering (e.g., to reroute traffic, upgrading links, etc.). As a further example, the identified large flows may be used to manage congestion and/or quality of service (e.g., by dropping packets of large flows, de-prioritizing large flows, applying a rate-limiting policy, or otherwise penalizing large flows). As yet another example, the identified large flows may be used to help detect or analyze a denial of service (DoS) attack. A still further example may involve using the identified large flows for service flow offload (e.g., in which deep packet inspection, security, or other heavy processing is bypassed for packets of large flows). These are just a few illustrative examples.

Various different approaches are known in the arts to attempt to detect or identify such heavy hitter flows, elephant flows, or other large flows. Often, in these approaches counters are used to count packets or sampled packets of the flows.

In one approach, a different counter is provided for each different flow. The counter is incremented each time a packet is received for the corresponding flow. Incrementing the counter basically counts the number of packets received for the corresponding flow. However, often the number of different flows may be relatively large. As a result, one possible drawback with such an approach is that including a counter for each different flow may tend to be prohibitive in terms of the amount of memory and memory access bandwidth resources needed to implement the relatively large number of counters.

Various other approaches attempt to use more elaborate mechanisms to detect large flows in order to reduce the amount of memory and other resources. One approach is described in the paper "NEW DIRECTIONS IN TRAFFIC MEASUREMENT AND ACCOUNTING," by Cristian Estan et al., published in Proceedings of ACM SIGCOMM, pp. 323-336, August 2002. This reference describes an approach for identifying large flows that involves sample and hold and multistage filters. The sample and hold samples packets with a probability. If a packet is sampled and the flow it belongs to is not currently being tracked (e.g., does not yet have a counter), then a new entry is created in the flow monitoring memory to track that flow. After an entry is created for the flow, the counters are updated for every subsequent packet of the flow, not just for sampled packets of that flow. The parallel multistage filters operate in parallel. A packet flow identifier is hashed with different hash functions to identify a counter in each of the different filter stages arranged in parallel, and the different counters in each of the different parallel filter stages are updated to account for the packet. There is also a proposal of a serial multistage filter.

However, one possible drawback with the parallel multistage filters discusses in this reference is that over time there tends to be a decrease in the ability of the parallel multistage filters to detect large flows. All of the counters may reach their thresholds or maximum values and no longer increment. The reference describes that the flow memory and counters may be erased or reset at intervals. However, this erasing or resetting of the counters tends to introduce a discontinuity in large flow detection and adds additional latency to large flow detection. A way of using the parallel multistage filters for continuous operation without discontinuity in large flow detection and without needing to erase or reset the counters periodically is not provided.

SUMMARY

In one aspect, a network device, which is operable to be deployed in a network to receive packets of different flows, and which is operable to detect large flows of packets. The network device includes at least one card operable to receive the packets of the different flows from the network. The network device includes a large flow detection module. The large flow detection module includes a serial multiple-stage filter module that includes a plurality of filter modules coupled together in series. The filter modules include a lead filter module at a start of the series, and a tail filter module at an end of the series. Each of the filter modules includes a plurality of counters. The serial multiple-stage filter module is operable to serially increment the counters of the filter modules to reflect the packets of the different flows. The serial multiple-stage filter module is operable to increment counters that correspond to packets of flows of subsequent filter modules in the series only after all counters that correspond to the packets of the flows of all prior filter modules in the series have been incremented serially up to corresponding maximum values. The serial multiple-stage filter module is operable to detect flows of packets that correspond to counters of the tail filter module that have been incremented up to corresponding maximum values as the large flows of packets. The large flow detection module also includes a lead filter removal module coupled with the serial multiple-stage filter module. The lead filter removal module is operable to remove the lead filter module from the start of the series. One possible advantage of the network device is an ability to purge accounting for flows over time, which may be used to avoid discontinuities in large flow detection, and optionally allow continuous operation.

In another aspect, a method is performed by a network device that is deployed in a network and that receives packets of different flows to detect large flows of packets. The method includes a step of receiving the packets of the different flows from the network at one or more cards of the network device. The method also includes a step of serially incrementing counters at each of a series of counter stages to reflect the packets of the different flows. This is done at a lead counter stage at a start of the series, and at a tail counter stage at an end of the series. Serially incrementing the counters includes incrementing counters that correspond to packets of flows of subsequent counter stages in the series only after serially incrementing all counters that correspond to the packets of the flows of all prior counter stages in the series up to corresponding maximum values. The method further includes a step of detecting the large flows of packets as flows of packets that correspond to counters of the tail counter stage that have reached corresponding maximum values. The method additionally includes a step of removing the lead counter stage from the start of the series of counter stages. One possible advantage of the method is an ability to purge accounting for flows over time, which may be used to avoid discontinuities in large flow detection, and optionally allow continuous operation.

In yet another aspect, an edge router device, which is operable to be deployed at an edge of an OpenFlow network to receive packets of different flows, and which is operable to detect large flows of packets. The edge router device includes at least one card operable to receive the packets of the different flows from the OpenFlow network. The edge router device includes a large flow detection module. The large flow detection module includes a serial multiple-stage filter module that includes a plurality of filter modules coupled together in series. The filter modules include a lead filter module at a start of the series, and a tail filter module at an end of the series. Each of the filter modules includes a plurality of counters. The serial multiple-stage filter module is operable to serially increment the counters of the filter modules to reflect substantially all of the packets of the different flows in-line and at link speed. The serial multiple-stage filter module is operable to increment counters that correspond to packets of flows of subsequent filter modules in the series only after all counters that correspond to the packets of the flows of all prior filter modules in the series have been incremented serially up to corresponding maximum values. The serial multiple-stage filter module is operable to detect flows of packets that correspond to counters of the tail filter module that have been incremented up to corresponding maximum values as the large flows of packets. The large flow detection module also includes a lead filter removal module coupled with the serial multiple-stage filter module. The lead filter removal module is operable to remove the lead filter module from the start of the series during operation of at least one other filter module of the plurality. The large flow detection module also optionally includes a tail filter addition module coupled with the serial multiple-stage filter module. The tail filter addition module is operable to add a new tail filter module at the end of the series during operation of at least one other filter module of the plurality. One possible advantage of the edge router device is an ability to purge accounting for flows over time, which may be used to avoid discontinuities in large flow detection, and optionally allow continuous operation.

In a still further aspect, a method, performed by an edge router device that is deployed at an edge of an OpenFlow network and that receives packets of different flows. The method is one of detecting large flows of packets. The method includes a step of receiving the packets of the different flows from the OpenFlow network at one or more cards of the network device. The method includes a step of serially incrementing counters at each of a series of counter stages to reflect substantially all of the packets of the different flows in-line and at link speed, including at a lead counter stage at a start of the series, and at a tail counter stage at an end of the series. Serially incrementing the counters includes incrementing counters that correspond to packets of flows of subsequent counter stages in the series only after serially incrementing all counters that correspond to the packets of the flows of all prior counter stages in the series up to corresponding maximum values. The method includes a step of detecting the large flows of packets as flows of packets that correspond to counters of the tail counter stage that have reached corresponding maximum values. The method includes a step of removing the lead counter stage from the start of the series of counter stages during operation of at least one other counter stage of the series of counter stages. The method includes a step of adding a new tail counter stage at the end of the series of counter stages during operation of at least one other counter stage of the series of counter stages.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Described herein are methods and apparatus to remove lead filters from serial multiple-stage filters in order to purge records/accounting of flows and help allow prolonged large flow detection without discontinuity. In the following description, numerous specific details are set forth. For example, specific serial multiple-stage filters, filters, arrays of counters, orders of operations, logic partitioning/integration choices, and the like, and are set forth. However, it is understood that embodiments of the invention may be practiced without these specific details. In other instances, well-known circuits, structures and techniques have not been shown in detail in order not to obscure the understanding of this description.

Figure 1:
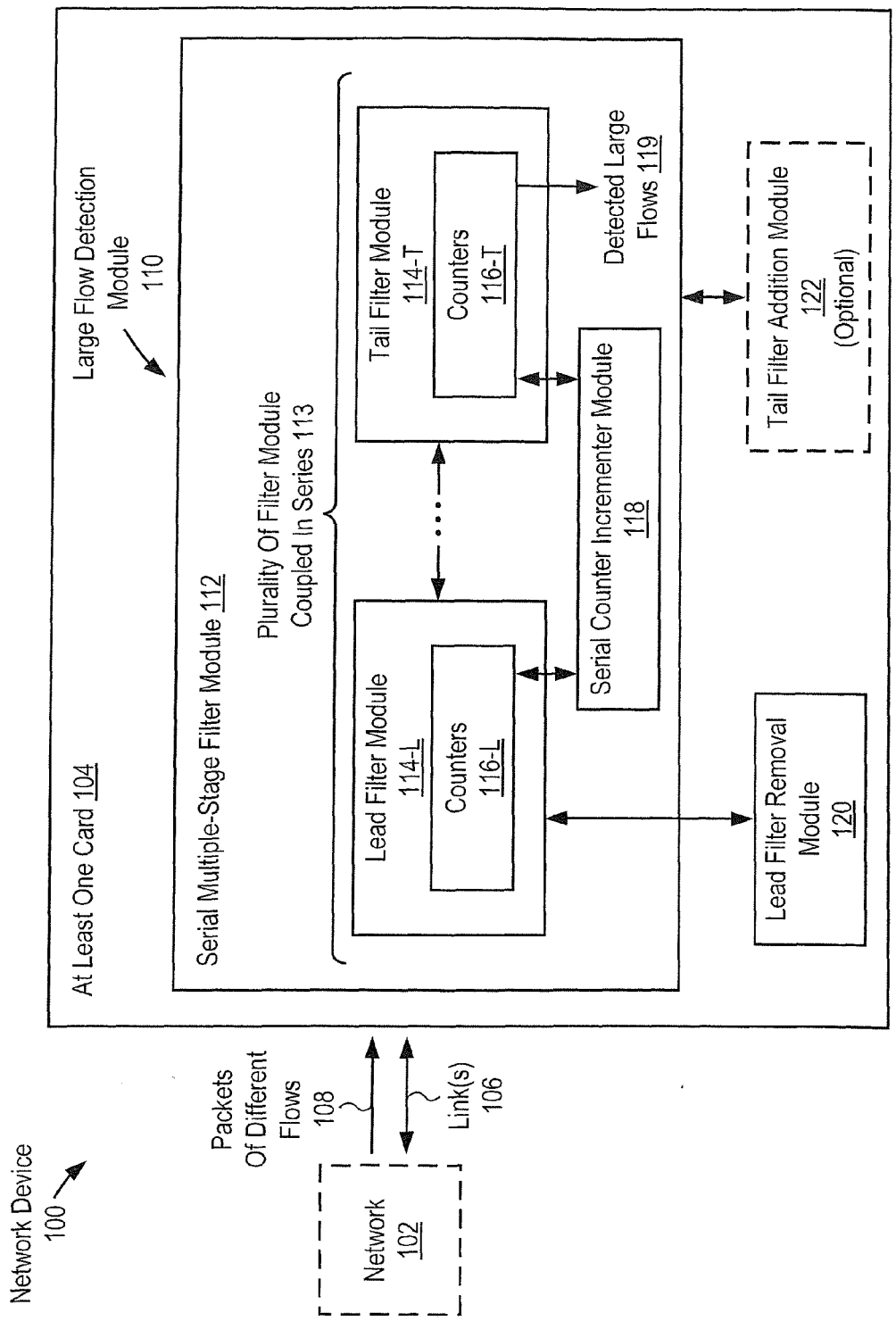
FIG. 1 is a block diagram of an embodiment of a network device that is operable to detect large flows of packets and remove filters to purge accounting for flows.

FIG. 1 is a block diagram of an embodiment of a network device 100. As used herein, a network device (e.g., a router, switch, bridge) is a piece of networking equipment, including hardware and software, which communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

Network devices are commonly separated into a control plane and a data plane (sometimes referred to as a forwarding plane or a media plane). In the case that the network device is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network devices to exchange routes and select those routes based on one or more routing metrics.

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols. For layer 2 forwarding, the network device can store one or more bridging tables that are used to forward data based on the layer 2 information in that data.

Typically, a network device includes at least one card. The one or more cards may include control cards, line cards, service cards, resource cards, or the like, in any known combination used in network devices known in the arts. These cards are generally coupled together through one or more mechanisms (e.g., a first full mesh coupling the line cards and a second full mesh coupling all of the cards). The set of line cards make up the data plane, while the set of control cards provide the control plane and exchange packets with external network device through the line cards. The set of service cards or resource cards may provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)).

Referring again to FIG. 1, the network device is operable to be deployed in, and coupled with, a network 102. The network device includes at least one card 104 that is operable to be coupled with the network through one or more links 106. In some embodiments, the at least one card may include at least one or a plurality of line cards, service cards, resource cards, or various combinations thereof. The at least one card 104 is operable to receive packets of different flows 108 from the network over the link(s) 106. Examples of suitable networks include, but are not limited to, OpenFlow networks, software defined networks (SDN), flow based fourth generation (4G) Internet protocol (IP) networks, other IP networks, any other networks encountering elephant flows, and the like, to name just a few illustrative examples.

The network may utilize traffic flows, network flows, or other packet flows. The packet flow may represent a pattern that indicates which packets are to be monitored together as part of the flow and a flow identifier (e.g., the values of a set of packet header fields). The flow identifier may also optionally be a function of the packet header field value(s), for example, by using prefixes instead of addresses based on a mapping using route tables. Often, the packet flows may represent a sequence of packets sent from a source device to a destination. By way of example, the destination may be a destination or host device, a unicast destination, a multicast group, a broadcast domain, an anycast domain, etc. In some cases the packet flow may include all packets in a specific transport connection or a media stream. Alternatively, it is not required that the flow has a one-to-one mapping to a transport connection or a media stream. As an example, packets of a TCP/IP flow may be uniquely identified within a certain time period by a flow identifier based on Source and Destination IP addresses, Source and Destination Ports, and a protocol (e.g., TCP, UDP, ICMP, another Layer 4 protocol, etc.). Alternatively, the packet flows may represent other sequences of packets desired to be logically considered as belonging to a flow, stream, or particular traffic.

The network device may be operable to detect which of the different flows of packets 108 are relatively large flows of packets (e.g., elephant flows, heavy hitter flows, etc.). The network device includes a large flow detection module 110. In some embodiments, the large flow detection module may be implemented on the at least one card 104. In various embodiments, the large flow detection module may include hardware (e.g., circuitry), firmware, software, or a combination thereof. In some embodiments, the large flow detection module may include at least some hardware optionally combined with one or more of firmware and/or software. The large flow detection module may be operable to determine the sizes of the flows of the packets, and may be operable to detect which of the flows of the packets are relatively large flows of packets (e.g., elephant flows, heavy hitter flows, or other relatively large flows). Depending on the implementation, flows with a large number of packets may be classified as large flows, or flows with large sized packets may be classified as large flows, or a combination thereof.

In some embodiments, the large flow detection module 110 may include a serial multiple-stage filter module 112. The serial multiple-stage filter module may include a plurality of filter modules 114 coupled together in series 113. In the illustrated embodiment, the series coupled filter modules include a lead filter module 114-L at the start of the series, a tail filter module 114-T at the end of the series, and optionally one or more other intervening filter modules (not shown) coupled in series between the lead and tail filter modules. In some embodiments, there may be between about 2 to about 20 filter modules, or in some cases between about 3 to about 10 filter modules, although the scope of the invention is not so limited.

In some embodiments, each of the filter modules 114 may have a corresponding plurality of counters. As shown, the lead filter module may have a first, lead set of counters 116-L, and the tail filter module may have a second, tail set of counters 116-T. In some embodiments, the number of counters in each filter may range from on the order of tens of counters (e.g., from about 10 to about 100) to on the order of tens of thousands of counters (e.g., from about 10,000 to about 100,000). In some embodiments, the number of counters in each filter may range from on the order of about 1,000 to on the order of about 50,000, although the scope of the invention is not so limited. In one particular example embodiment, there may be between about three to about seven filter modules and each filter module may have on the order of about 1,000 to 10,000 counters, although the scope of the invention is not so limited. The number of counters desired for the particular implementation may depend on various factors, such as the number of flows (e.g., generally more counters for more flows), the desired accuracy of the large flow monitoring (e.g., generally more counters for more accurate monitoring), the number of filters (e.g., generally less counters per filter for more filters), etc.

In some embodiments, the serial multiple-stage filter module 112 may include a serial counter incrementer module 118 coupled with the counters that may be operable to serially increment the counters 116 of the filter modules 114 to reflect the packets of the different flows 108. In some embodiments, the serial multiple-stage filter module and/or the serial counter incrementer module may be operable to increment counters that correspond to packets of flows of subsequent filter modules in the series only after all counters that correspond to the packets of the flows of all prior filter modules in the series have been incremented serially up to corresponding maximum values. In one aspect, the corresponding counters of subsequent filter modules may only see those packets that have passed the corresponding counters of all previous filter modules without incrementing any of those previous counters. In some cases, a counter corresponding to a flow may be incremented by one for each packet of the flow to effectively count the packets of the flow. In other cases, the counter corresponding to the flow may be incremented based on the sizes of the packets (e.g., in number of bytes) of the flow (e.g., incremented by a larger amount for larger packets than for smaller packets).

In some embodiments, each counter may have a corresponding maximum value or threshold. When the counters reach their maximum values they may be said to have "overflown." Generally, after a counter reaches its maximum value, it will not be further incremented. Rather a subsequent counter in the series that corresponds to the packet, and which has not overflown, will be incremented instead. At some point, for example, after a sufficient number of packets of the flow and/or a sufficient total size of the packets of the flow have been received, all of the counters in the series that correspond to the flow will also have reached their maximum values. In some embodiments, the serial multiple-stage filter module may be operable to detect flows that correspond to counters of the last, tail filter module 114-T that have been incremented up to corresponding maximum values as the large flows of packets 119. That is, counters of the tail filter module that become overflow may be indicative of large flows 119.

In some embodiments, each of the counters may be shared by multiple or potentially many different flows. For example, as will be explained further below, packets of different flows may be hashed or otherwise mapped to the same counter. Advantageously, sharing the counters among different flows may help to reduce the amount of memory resources needed to implement the serial multiple-stage filter module. The memory resources needed to implement the serial multiple-stage filter module may be independent of, or at least less dependent on, the total number of flows. The total number of counters and/or the total amount of memory needed does not need to be directly proportional to the total number of flows. Now, this may potentially cause false positive results to occur in two different ways. Firstly, a small flow may hash or otherwise map to the same counter as a large flow. Secondly, several small flows may hash or otherwise map to the same counter and collectively add up to a large flow even though none of the small flows are themselves large flows. However, by including multiple filter modules in series, this may help to reduce the number of such false positive outcomes and help to increase the accuracy of large flow detection. If desired, the number of such false positive results may be decreased by including a greater number of filter stages in series.

In some embodiments, the serial multiple-stage filter module and/or the serial counter incrementer module may be operable to serially increment the counters of the filter modules to reflect substantially all packets of all flows, rather than just a subset of sampled packets of the flows. As used herein, substantially all packets of a flow means at least 95% of the packets of the flow. Advantageously, incrementing the counters based on substantially all packets of all flows may help to provide better accuracy and/or faster response times in detecting large flows as compared to if the counters were incremented based on sampled packets. In some embodiments, the serial multiple-stage filter module and/or the serial counter incrementer module may be operable to serially increment the counters of the filter modules to reflect the packets of the flows in-line and at link speed. Alternatively, the filter module may also optionally be run offline and not necessarily at link speed, if desired. In some embodiments, the serial multiple-stage filter module may maintain an approximate measure for all flows.

Large flow detection approaches that utilize sampled packets generally tend to have more time to process each sampled packet. This additional time may be used to implement a mechanism to age and delete monitored flows, which may help to allow the filters to run for longer periods or in some cases nearly continuously. Sampling-based approaches generally tend to have higher than desirable response times and/or large flow detection latencies. Not all packets are processed but rather only sampled packets, which tends to lengthen the period of time over which large flows can be detected. In contrast, approaches that work on all packets generally tend to have lower response times and/or large flow detection latencies. However, such approaches that work on all packets also generally tend to have less time to process each packet due to the need to process packets in real time at or near the link speed. As a result, often such approaches that work on substantially all packets of a flow are not able to perform the processing needed to age and delete monitored flows. Consequently, often such approaches that work on substantially all packets are not able to run for prolonged periods of time without discontinuities due to erasing or resetting counters.

Referring again to FIG. 1, over a long enough period of time and/or when enough packets of different flows have been received by the network device 100, many, most, or all of the counters 116 of the lead filter module 114-L may eventually reach their corresponding maximum values. This is because the counters in the lead filter module 114 may initially be incremented by substantially all incoming packets of all flows. The overflown counters may not be able to participate in further counting/incrementing and generally will not contribute as beneficially to the large flow detection accuracy as the counters that have not yet overflown and are still able to increment. As a result, the usefulness of the lead filter module 114-L may decrease over time. The large flow detection module may begin to operate as if there were one less filter module 114 in the series 113 than actually exists. By contrast, the next filter module in the series, at least at some points in time, may have a lesser number of overflown counters than the lead filter. This is because only the flows that encountered an overflown counter in lead filter module will have incremented a counter of the next filter module in the series.

The large flow detection module 110 includes an embodiment of a lead filter removal module 120. The lead filter removal module is coupled with the lead filter module 114-L and/or the serial multiple-stage filter module 112. In some embodiments, the lead filter removal module 120 may be operable to remove the lead filter module 114-L from the start of the series. Removing the lead filter module from the start of the series may make the next filter module in the series the new lead filter module and may effectively shift each of the other filter modules in the series one position in the direction of the start of the series. In some embodiments, the removal of the lead filter module may be performed during operation (e.g., continuous operation) of at least one other filter module of the series (e.g., there may be no need to remove, reset, or erase the counters of that other filter module). Various different ways are contemplated for determining times to remove the lead filter module 114-L. In various embodiments, the lead filter module may be removed at periodically intervals or times, based on a total number of packets received meeting a threshold, when a number and/or proportion of its counters 116-L that are overflow meets a threshold, etc. Advantageously, removing the lead filter module 114-L may help to age, purge, and/or delete counter data and/or records of flows. This may help to allow the large flow detection module to operate over prolonged periods of time, or in some cases optionally continuously/indefinitely, without needing to erase/reset all the counters or restart the entire serial multiple-stage filter module periodically, and without significant discontinuities in the ability to detect large flows. Moreover, there is no requirement to implement a mechanism to detect the end/termination of a flow in order for the flow to be removed from the state of the filter over time. Such mechanisms to detect the end/termination of a flow often tend to be complex, and in some cases may not even be feasible or even possible (e.g., for connectionless protocols like UDP).

Referring again to FIG. 1, in some embodiments, the large flow detection module 110 may optionally include an embodiment of a tail filter addition module 122. The tail filter addition module is coupled with the serial multiple-stage filter module 112. In some embodiments, the optional tail filter addition module 122 may be operable to add a new tail filter module (not shown) at the end of the series 113. In some embodiments, the new tail filter module may be added during operation (e.g., continuous operation) of at least one other filter module of the series. In some embodiments, the new tail filter module may be added to replace a removed lead filter module 114-L in order to maintain a constant number of filter modules.

In some embodiments, the tail filter addition module may be operable to add a different (e.g., greater or lesser) number of new filter modules to the serial multiple stage filter module over a period of time than a number of lead filter modules removed from the serial multiple stage filter module over the period of time. This may be used to increase or decrease the total number of filter modules in order to increase or decrease accuracy and/or the filter implementation resources. For example, the number of filter modules may be increased to increase the accuracy of the filter at the expense of additional resources being needed to implement the additional filter modules.

In some embodiments, the tail filter addition module 122 may be operable to add the new tail filter module which has a different (e.g., greater or lesser) number of counters than a number of counters of the lead filter module. This may help to allow for dynamically changing the accuracy of system and/or the resources used to implement the counters. For example, the accuracy may be increased by adding more counters at the expense of more memory resources being needed to implement the additional counters.

Changing the number of filters may also be used to balance a tradeoff between accuracy of detecting large flows and the time or latency needed to detect the large flows. Generally, the more filters in series, the greater the accuracy of detecting large flows. However, generally increasing the number of filters also tends to increase the amount of time needed to detect a large flow, provided that the number of counters in each filter are not correspondingly reduced. In some embodiments, a determination may be made to improve the accuracy of detection, and in response the number of filter modules may be increased (e.g., by adding additional tail filter modules). In other embodiments, a determination may be made to reduce the time or latency needed to detect large flows, and in response the number of filter modules may be reduced. For example, this may be achieved by removing the lead filter module as well as potentially other filter modules (e.g., removing the tail filter module, removing multiple filters from the tail of the series, removing any other filter module, etc.).

Advantageously, the removal of the lead filter module 114-L and/or the addition of the new tail filter module generally are not disruptive to the operation of the large flow detection module 110. A series of filter modules 113 is used and the large flow monitoring information for the different flows (e.g., the values of the counters) is distributed among the different filter modules 114 of the series. As a result, the removal and/or the addition of the filter modules may be performed in a generally incremental manner that does not significantly impact the other filter modules (e.g., the values of their corresponding counters) and/or the flow-to-counter correspondences. The values of the counters of the remaining filter modules as well as the overall approach of serial incrementing of the remaining filter modules in the series remains generally unchanged by the addition or removal of the filter modules.

Figure 2:
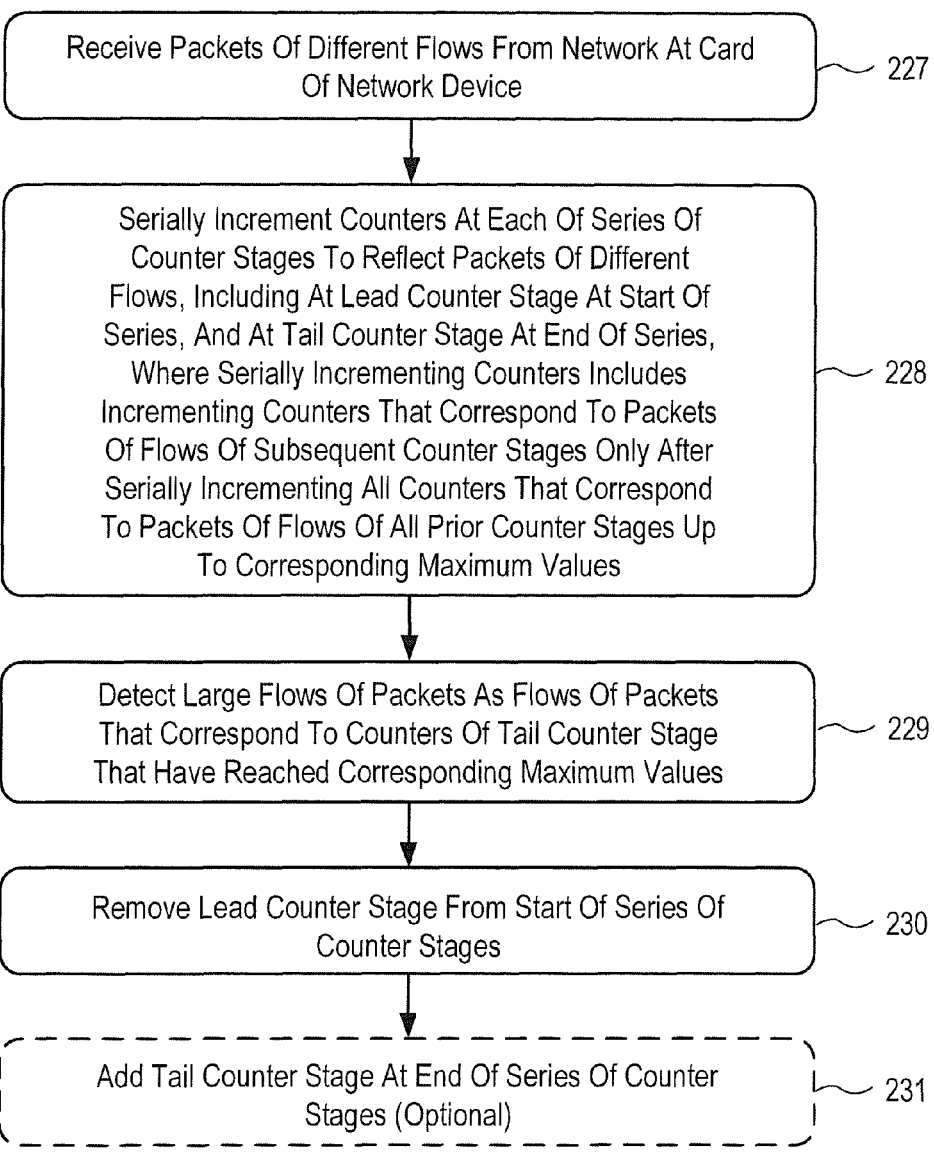
FIG. 2 is a block flow diagram of an embodiment of a method of detecting large packet flows and removing counters to purge accounting for flows.

FIG. 2 is a block flow diagram of an embodiment of a method 226 of detecting large flows of packets. In some embodiments, the method may be performed by a network device that is deployed in a network and that receives packets of different flows from the network. In some embodiments, the operations and/or method of FIG. 2 may be performed by and/or within the network device of FIG. 1. The optional details described above for the network device of FIG. 1 also optionally apply to the operations and/or method of FIG. 2, which may be performed by and/or within such a network device. Alternatively, the operations and/or method of FIG. 2 may be performed by and/or within a similar or different network device. Moreover, the network device of FIG. 1 may perform operations and/or methods that are the same, similar, or different than those of FIG. 2.

The method includes receiving the packets of the different flows from the network at one or more cards of the network device, at block 227. In various embodiments, the packets may be received at one or more cards selected from line cards, service cards, resource cards, or various combinations thereof.

The method also includes serially incrementing counters at each of a series of counter stages to reflect the packets of the different flows, at block 228. This may include incrementing counters at a lead counter stage at a start of the series, and incrementing counters at a tail counter stage at an end of the series. Serially incrementing the counters may include incrementing counters that correspond to packets of flows of subsequent counter stages in the series only after serially incrementing all counters that correspond to the packets of the flows of all prior counter stages in the series up to corresponding maximum values. In some embodiments, the counters at the different serial counter stages may be incremented to reflect substantially all packets of all flows in-line in real time and at link speed. In some cases, the counters may be incremented by one for each corresponding packet to effectively count the packet, or in other cases the counters may be incremented based on the sizes of the packets (e.g., in number of bytes).

The method also includes detecting the large flows of packets as flows of packets that correspond to counters of the tail counter stage that have reached corresponding maximum values, at block 229. For example, when a counter of the tail counter stage becomes overflown and can no longer increment, the corresponding flow may be detected or classified as a large flow.

The method further includes removing the lead counter stage from the start of the series of counter stages, at block 230. In some embodiments, the lead counter stage may be removed during operation (e.g., while packets are received and counters of one or more other counter stages of the series are incremented). In various embodiments, the lead counter stage may be removed at a periodic interval of time, when a predetermined number of packets have been received, or based at least in part on determining that a proportion of counters of the lead counter stage that have reached a corresponding maximum value has met a threshold.

In some embodiments, the method may optionally include adding a new tail counter stage at the end of the series of counter stages, at block 231. Alternatively, a new counter stage may be added at another location in the series. In some embodiments, the new counter stage may be added during operation (e.g., while packets are received and counters of one or more other counter stages of the series are incremented). In some embodiments, the new counter stage that is added may have a different number of counters (e.g., a greater number or a lesser number) than a number of counters of the lead counter stage that was removed. Advantageously, this may allow changing the accuracy of the large flow detection and/or may allow changing the resources needed for the large flow detection (e.g., changing the amount of memory used to implement the counters). In some embodiments, the method may further include increasing a total number of counter stages by more than one over a period of time by adding a greater number of counter stages (e.g., new tail counter stages) over the period of time than a number of counter stages removed (e.g., lead counter stages) over the period of time.

The method 226 has been described in a relatively basic form, but operations may optionally be added to and/or removed from the method. For example, another method may perform removal and optional addition of filter modules at an early stage prior to any large flows being detected. In addition, while FIG. 2 shows a particular order of operations, that particular order is exemplary. Alternate embodiments may optionally perform the operations in different order, combine certain operations, overlap certain operations, etc. For example, the removal and/or addition of the filter modules may overlap the operations of blocks 228 and/or 229. As another example, addition of a filter may occur prior to, or concurrently with, removal of a filter.

Figure 3:
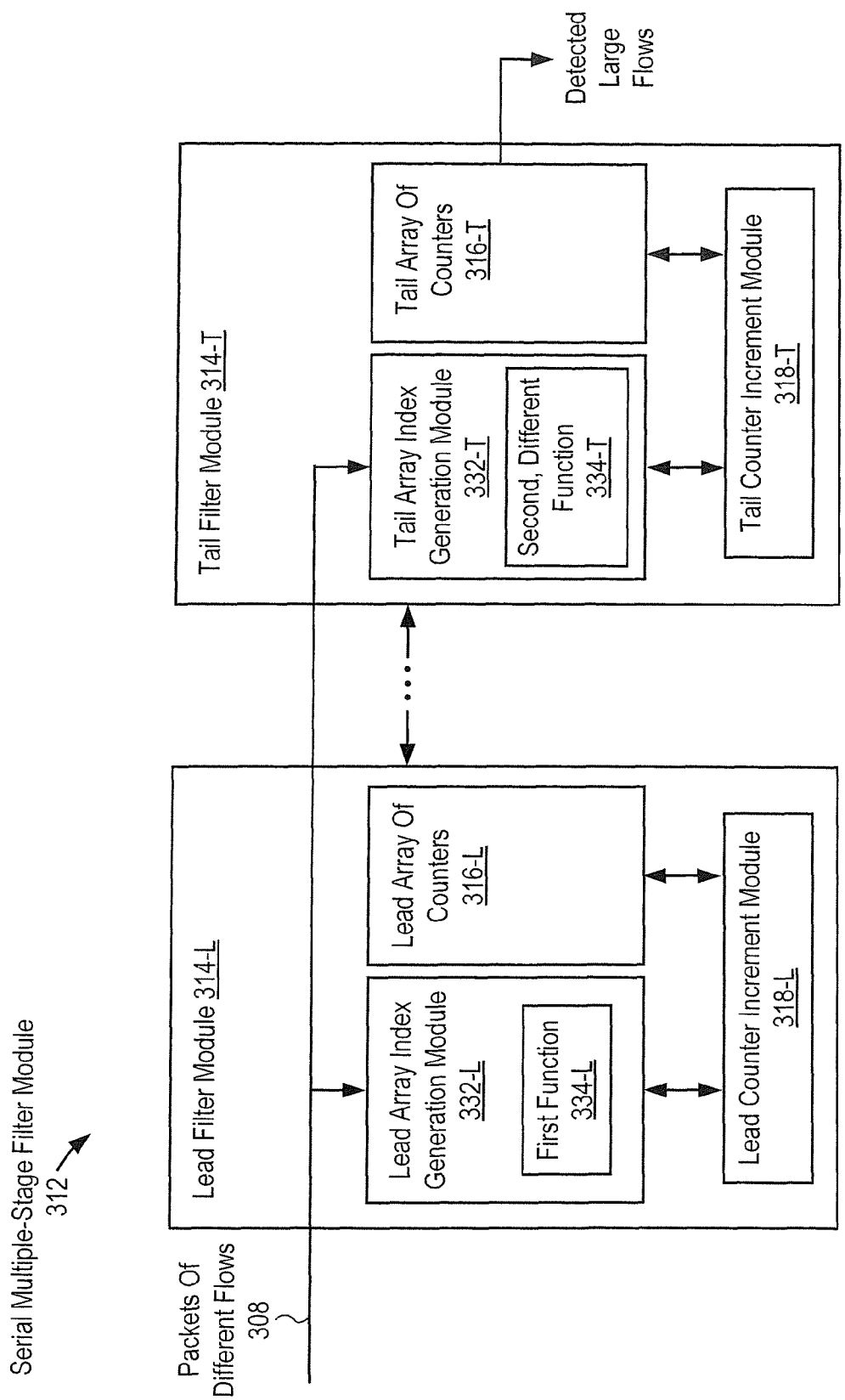
FIG. 3 is a block diagram of a detailed example embodiment of a serial multiple-stage filter module.

FIG. 3 is a block diagram of a detailed example embodiment of a suitable serial multiple-stage filter module 312. In some embodiments, the multiple-stage filter module of FIG. 3 may be used in the network device of FIG. 1 and/or may be used to perform the method of FIG. 2. Alternatively, the network device of FIG. 1 and/or the method of FIG. 2 may utilize similar or different multiple-stage filter modules than those of FIG. 3.

The serial multiple-stage filter module 312 includes a plurality of filter modules 314 coupled in series. The filter modules include a lead filter module 314-L, a tail filter module 314-T, and optionally one or more intervening filter modules (not shown) coupled in series between the lead and tail filter modules. In some embodiments, each of the filter modules may include a corresponding array of counters 316. For example, as shown the lead filter module may include a lead array of counters 316-L, and the tail filter module may include a tail array of counters 316-T. The number of counters in the arrays may be the same or different and may have any of the numbers of counters described elsewhere herein.

In some embodiments, each of the filter modules may include a corresponding array index generation module 332. For example, as shown the lead filter module may include a lead array index generation module 332-L, and the tail filter module may include a tail array index generation module 332-T. In some embodiments, each array index generation module may be operable to use a different corresponding function 334 to generate an array index for a packet of a flow. For example, as shown the lead filter module may include a first function 334-L, and the tail filter module may include a second, different function 334-T. Each array index may be operable to identify a counter of the corresponding array of counters of the corresponding filter module, which is to be incremented if it is not already overflown. The different functions may be performed on and/or evaluated with information from the packets of the different flows 308 that is sufficient to identify the associated flows. This information sufficient to identify the flows may represent flow identifier information. By way of example, the flow identifier information for an IP packet may include a destination IP address, a source IP address, a source port, a destination port, and a protocol. Alternatively, different types of flows may be identified with different types of information as is known in the art.

In some embodiments, each array index generation module may be operable to use a different corresponding hash function. For example, the lead filter module may have a first hash function 334-L, and the tail filter module may have a second, different hash function 334-T. The hash functions may be used at least in part to deterministically map each of the different flows to a single corresponding counter in each of the different filter modules. The different hash functions when performed on and/or evaluated with the same flow identifier information may generate different corresponding deterministic hash function output values (sometimes called simply hash values). The same flow may map to counters at different relative positions in each of the different filter modules, which may help to create a relatively unique "signature" or "fingerprint" for the flow. Moreover, the same hash function when evaluated with different flow identifier information may map to the same counter. This may help to allow each of the counters to be shared by different flows, which may help to reduce the amount of memory or other resources needed to implement the counters. In some embodiments, the range of the hash function output values may be configured to correspond to the number of counters of the corresponding array of counters. Alternatively, a modulo operation based on the number of counters of the array of counters may be performed on the hash function output values to limit and map the modulo-hash function output values to the range of the number of counters of the array of counters.

Hash functions are generally able to reduce an input range of values to a narrower range of values of the hash function output value. Moreover, hash functions are generally able to approximately evenly or randomly distribute the input range of values over the hash function output range of values. However, other functions besides hash functions may optionally be used, if desired. For example, any known substitutes for hash functions known in the arts, or functions having similar characteristics to hash functions, may optionally be used instead. In the illustrated embodiment, a first function 334-L and a second function 334-T are shown, although in other embodiments, rather than using different separate/discrete functions (e.g., hash functions), a single function (e.g., a single hash function) may be used to generate a wide output value (e.g., a wide hash value), and then different contiguous portions of the wide output value may used by the different filter modules (e.g., a first fraction of a wide hash value may be mapped to the lead array of counters, another fraction of the wide hash value may be mapped to the tail array of counters, etc.).

Referring again to FIG. 3, in some embodiments, each of the filter modules may also include a corresponding counter increment module 318. For example, as shown the lead filter module may include a lead counter increment module 318-L, and the tail filter module may include a tail counter increment module 318-T. The counter increment modules may be coupled with the array of counters, and with the array index generation module, within the same corresponding filter module. In some embodiments, each counter increment module may be operable to increment the counter identified by the generated array index within the corresponding filter module to reflect the packet of the flow only after all counters that correspond to the packet of the flow of all prior filter modules have reached corresponding maximum values. Alternatively, rather than such distributed counter increment modules, a single counter increment module may optionally be used.

Figure 4:
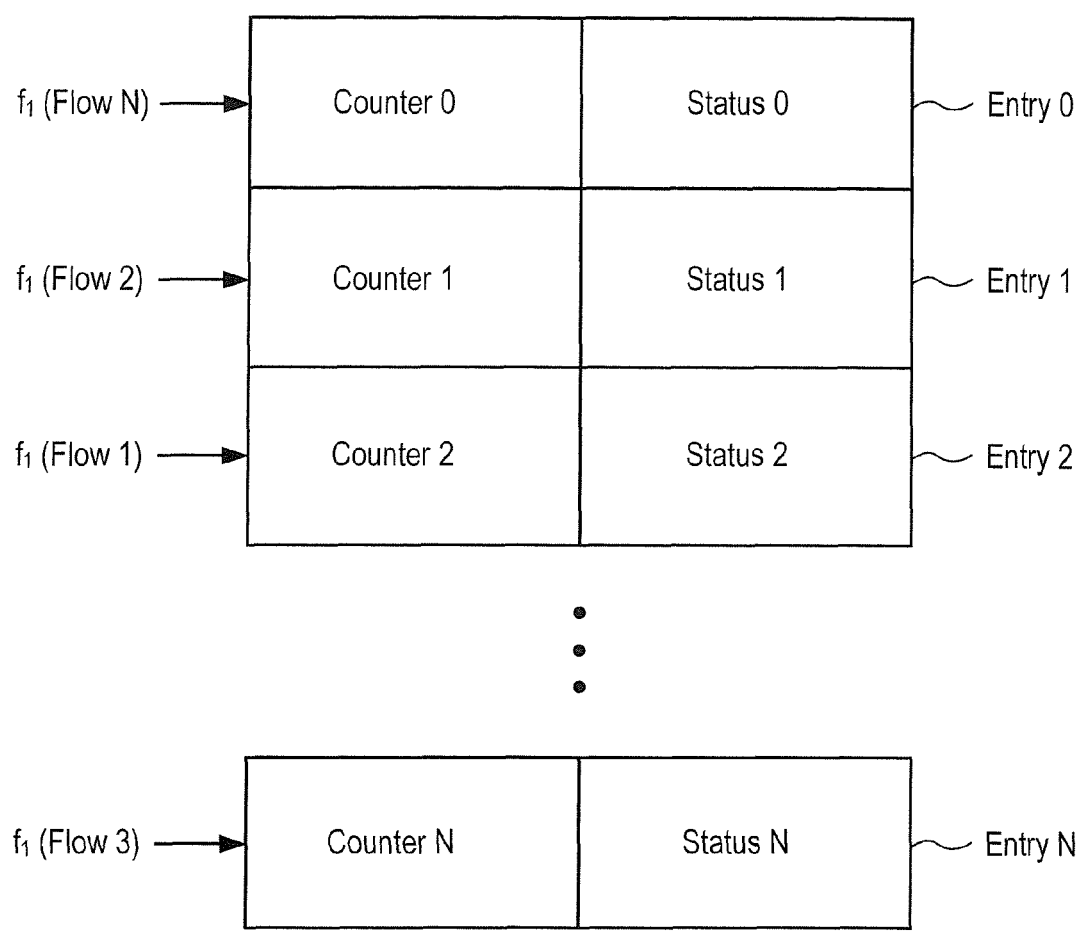
FIG. 4 is a block diagram of a detailed example embodiment of an array of counters.

FIG. 4 is a block diagram of a detailed example embodiment of an array of counters 416. In some embodiments, the array of counters of FIG. 4 may be used in the network device of FIG. 1 and/or may be used to perform the method of FIG. 2. Alternatively, the network device of FIG. 1 and/or the method of FIG. 2 may utilize similar or different arrays of counters than that of FIG. 4.

As shown, in some embodiments, the array of counters may, at least conceptually, be arranged as a table that includes a number of rows or entries each having a corresponding counter. By way of example, the table may be stored in memory. In the illustration, there is an entry 0 through an entry N. The number N may be any number of counters desired for the particular implementation, such as, for example, the number of counters for a filter stage described elsewhere herein. Each entry includes a corresponding counter and a counter status. For example, the entry 0 includes a counter 0 and a status 0, the entry 1 includes a counter 1 and a status 1, and so on. By way of example, in some embodiments, depending on their desired maximum values, each of the counters may be a 4-bit, 8-bit, or 16-bit counter, although the scope of the invention is not so limited. Each counter may be initialized to zero and then may be incremented. In some cases, each counter may be incremented by one to count a packet. In other cases, each counter may be incremented based on a size of the packet. Each status may indicate whether or not the corresponding counter has reached its maximum value and/or has overflown. For example, according to one possible convention, a value of zero may indicate that the counter has not overflown, while a value of one may indicate that the counter has overflown. The counters may be capable of being incremented as long as they have not overflown. When a counter reaches its maximum value, the status is changed to reflect that the counter has overflown. In other embodiments, the status may be omitted and instead inspection of the values of the counters may be used to determine whether or not the counters have reached their maximum values. In some embodiments, the counters need not be required to be able to be decremented. Alternatively, the counters may be decremented if desired (e.g., to help subtract out terminated flows, if desired).

A function (f1), such as, for example, a hash function taken modulo the number of entries) may be used to map packets of flows to the different entries and/or counters, as previously described. In the illustrated example, the function (f1) when evaluated with a packet of a first flow (flow 1) may map to the entry 2, the function (f1) when evaluated with a packet of a second flow (flow 2) may map to the entry 1, the function (f1) when evaluated with a packet of a third flow (flow 3) may map to the entry N, and the function (f1) when evaluated with a packet of an Nth flow (flow N) may map to the entry 0. This is just an illustrative example. The particular mapping depends on the particular function used. Moreover, when different functions are used the mappings may be different (i.e., correspond to different entries) for the same flows.

Figure 5:
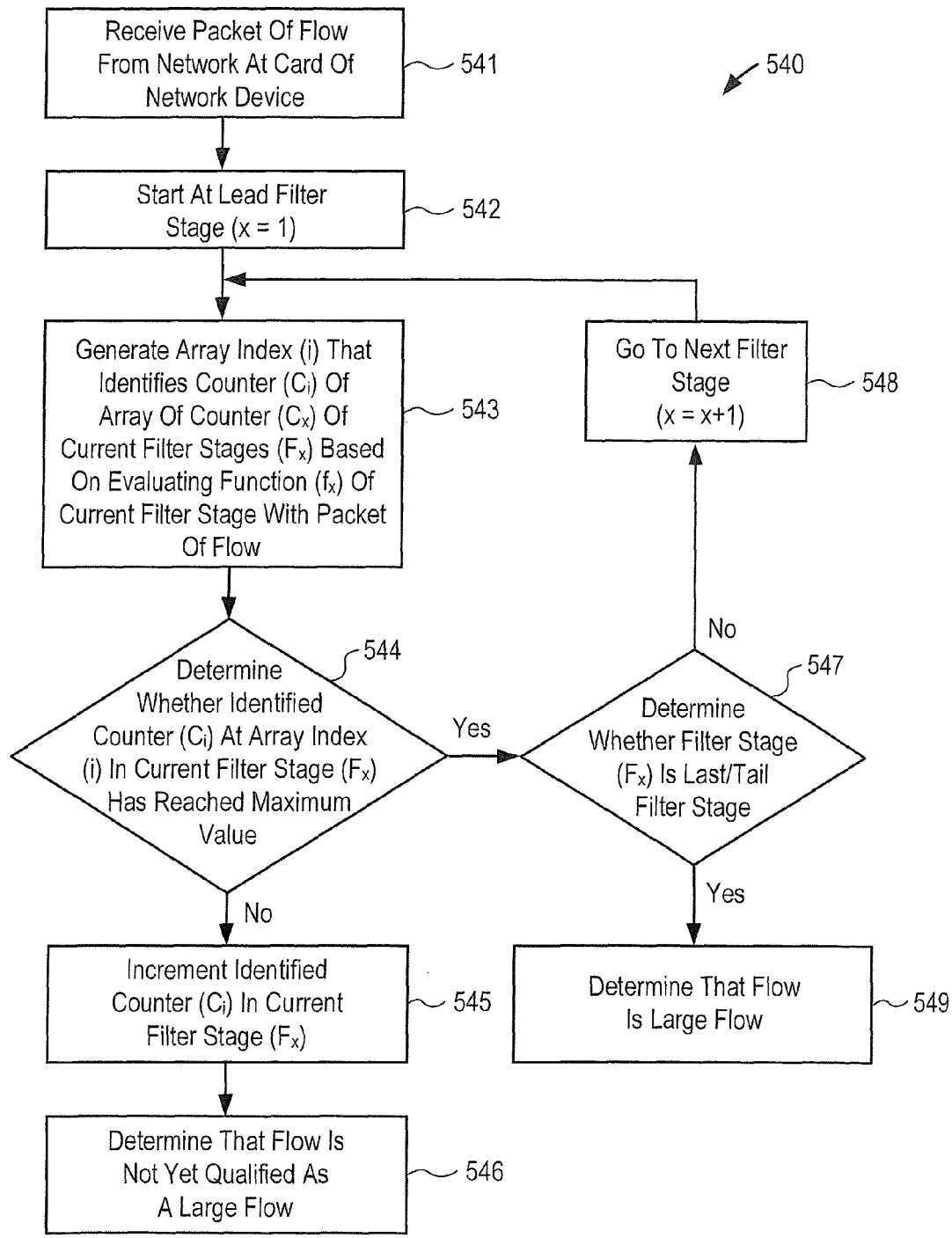
FIG. 5 is a block flow diagram of a detailed example embodiment of a method of serially incrementing a counter of a serial multiple-stage filter to reflect a packet of a flow.

FIG. 5 is a block flow diagram of a detailed example embodiment of a method 540 of serially incrementing a counter of a serial multiple-stage filter to reflect a packet of a flow. In some embodiments, the operations and/or method of FIG. 5 may be performed by and/or within the network device of FIG. 1. The optional details described above for the network device of FIG. 1 also optionally apply to the operations and/or method of FIG. 5, which may be performed by and/or within such a network device. Alternatively, the operations and/or method of FIG. 5 may be performed by and/or within a similar or different network device. Moreover, the network device of FIG. 1 may perform operations and/or methods that are the same, similar, or different than those of FIG. 5.

The method includes receiving a packet of a flow from a network at a card of a network device, at block 541. Filtering for the packet begins at a first lead filter stage (i.e., x=1), at block 542. At block 543, an array index (i) is generated for the packet that identifies a counter (Ci) of an array of counters (Cx) of the current filter stage (Fx) based on evaluating a function (fx) corresponding to the current filter stage (Fx) with the packet of the flow. In some embodiments, the function (fx) may be a hash function evaluated on a packet flow identifier taken modulo a number of counters of the array of counters (Cx), although this is not required. At block 544, a determination is made whether or not the counter (Ci) identified by the array index (i) in the current filter stage (Fx) has reached a corresponding maximum value. In some embodiments, this may include inspecting the status corresponding to the identified counter (Ci), although this is not required.

If the determination is that the identified counter (Ci) has not reached its corresponding maximum value (i.e., "no" is the determination at block 544), then the method may advance to block 545. At block 545, the identified counter (Ci) may be incremented in the current filter state (Fx). Then, a determination may be made that the flow is not yet to be qualified as a large flow, at block 546. Since a counter in the current filter stage has been successfully incremented, no further incrementing of counters needs to be done for the packet, and filtering processing of this packet may be completed.

Alternatively, if at bock 544 the determination is that the identified counter (Ci) has reached its corresponding maximum value (i.e., "yes" is the determination at block 544), then the method may advance to block 547. At block 547, a determination may be made whether or not the current filter stage (Fx) is the last/tail filter stage in the series of filter stages. If the determination is that the current filter stage (Fx) is not the last/tail filter stage, (i.e., "no" is the determination at block 547), then the method may advance to block 548. At block 548, processing may proceed to the next filter stage in the series (i.e., x=x+1), which in the first iteration would be the second filter stage. Since a counter was not successfully incremented in the current filter stage, the processing of the packet may proceed to the next filter stage in the series. The method may then revisit block 543. At block 543, another array index may be generated, and then at block 544 an attempt to increment the identified counter may be made, and so on, as described above. In some cases, the method may loop through blocks 543, 544, 547, and 548 multiple times until the last serial counter identifiable by the flow is found and incremented.

Referring again to block 547, at some point, after enough packets for a given flow have been received and/or enough large packets for the flow have been received, all counters identifiable for a flow may become overflown. In such situations, following a "yes" determination at block 544, the method may determine at block 547 that the filter stage (Fx) is the last/tail filter stage (i.e., "yes" may be the determination at block 547). In such cases, the flow may be determined to be a large flow, at block 549.

Figure 6A:
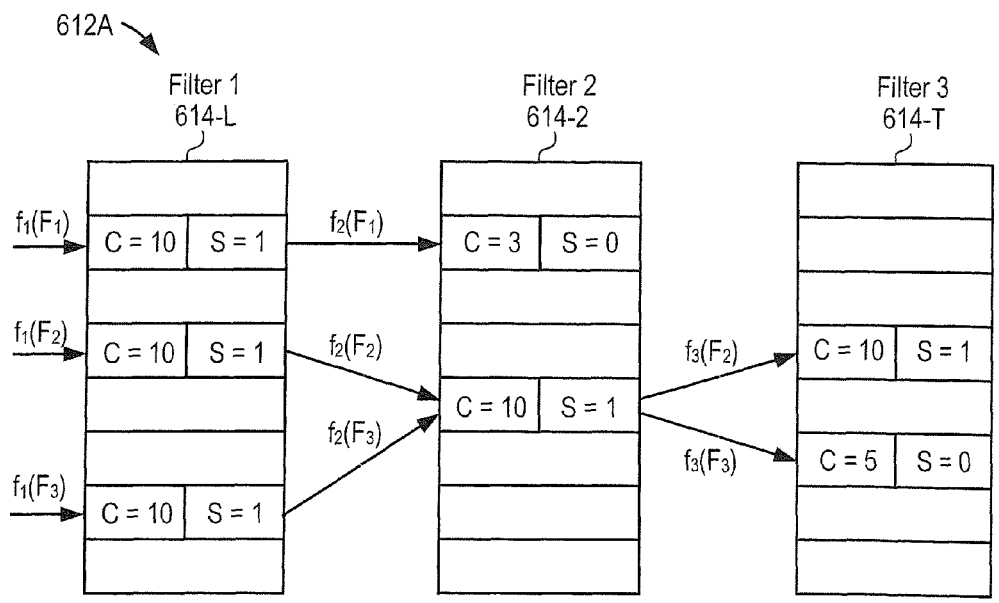
FIGS. 6A/B are block diagrams of detailed examples of serial three-stage filter modules before and after removal and addition of filter modules.

FIGS. 6A/B are block diagrams of detailed examples of serial three-stage filter modules 612 before and after removal and addition of filter modules. FIG. 6A illustrates the example serial three-stage filter module 612A before removal and addition of filter modules. The serial three-stage filter module includes filter 1 614-L which is a lead filter module at a start of the series, filter 2 614-2 coupled in series after filter 1, and filter 3 614-T coupled in series after filter 2 at as a tail filter module at an end of the series. In this example, for simplicity only three flows (F1-F3) are shown. A first function (f1) maps a first flow (F1) to a second entry of filter 1, the first function (f1) maps a second flow (F2) to a fourth entry of filter 1, and the first function (f1) maps a third flow (F3) to a seventh entry of filter 1. A second function (f2) maps the first flow (F1) to a second entry of filter 2, the second function (f2) maps the second flow (F2) to a fifth entry of filter 2, and the second function (f2) maps the third flow (F3) to a fifth entry of filter 2. A third function (f3) maps the second flow (F2) to a fourth entry of filter 3, and the third function (f3) maps the third flow (F3) to a sixth entry of filter 2.

In this example, each of the counters has a maximum value of ten at which point they become overflown. Thirteen packets have been received for the first flow (F1). In this example, the first flow (F1) does not share any counters with any other flows. The counter in the second entry of filter 1 has been incremented ten times (C=10) and has overflown. The status of that counter has been changed to indicate that the counter has been overflown (s=1). The counter in the second entry of filter 2 has been incremented three times (C=3) and has not yet overflown. The status of this counter indicates that the counter has not overflown (s=0).

At least twenty and perhaps more packets have been received for the second flow (F2). The counter in the fourth entry of filter 1 has been incremented ten times (C=10) and has overflown. The status of that counter has been changed to indicate that the counter has been overflown (s=1). The counter in the fifth entry of filter 2 has also been incremented ten times (C=10) and has overflown. The status of that counter has been changed to indicate that the counter has been overflown (s=1). The counter in the fourth entry of filter 3 has also been incremented ten times (C=10) and has overflown. The status of that counter has been changed to indicate that the counter has been overflown (s=1). Accordingly, packets of the second flow (F2) have passed through all three filters and have overflown the counters of the tail filter (i.e., filter 3). As a result, the second flow (F2) may be classified as a large flow.

At least fifteen and perhaps more packets have been received for the third flow (F3). The counter in the seventh entry of filter 1 has been incremented ten times (C=10) and has overflown. The status of that counter has been changed to indicate that the counter has been overflown (s=1). The counter in the fifth entry of filter 2 has also been incremented ten times (C=10) and has overflown. The status of that counter has been changed to indicate that the counter has been overflown (s=1). The counter in the fifth entry of filter 2 is shared by both flow 2 (F2) and flow 3 (F3) and so either or both flows may increment that counter. The counter in the sixth entry of filter 3 has been incremented five times (C=5) and has not yet overflown. The status of that counter indicates that the counter has not yet overflown (s=0).

Figure 6B:
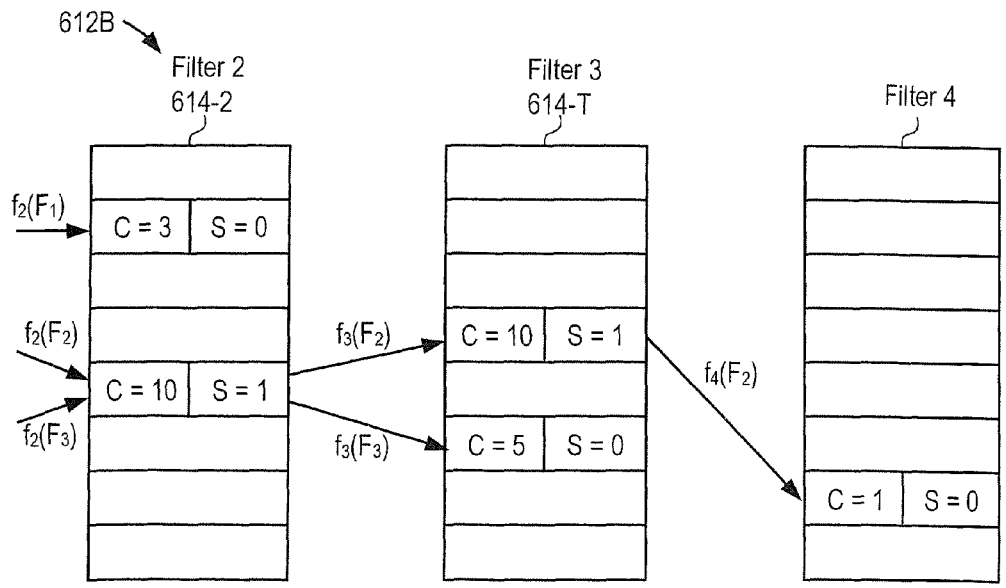

FIG. 6B illustrates the example serial three-stage filter module after removal of the lead filter module of FIG. 6A (i.e., filter 1) and addition of a new tail filter module (i.e. filter 4). As shown, removal of filter 1 removes several already overflown counters and/or removes the record of packets previously received for flows. This represents removal or purging of records or accounts of previously received packets. This may help to age or delete flows from the system. Filter 2 which was initially second in the series in FIG. 6A, has now become the first lead filter module in the series. Similarly, filter 3 which was initially third in the series, has now become second in the series. The added filter 4 serves as the new tail filter module which at the end of the series. As shown, whereas entry four of filter 3 has already overflown for flow 2, a fourth function (f4) may map the second flow (F2) to a seventh entry of the filter 4 which may initially have all counters initialized to zero. When a new packet for the second flow (F2) is received, the counter of the seventh entry of the filter 4 may be successfully incremented (C=1).

Figure 7A:
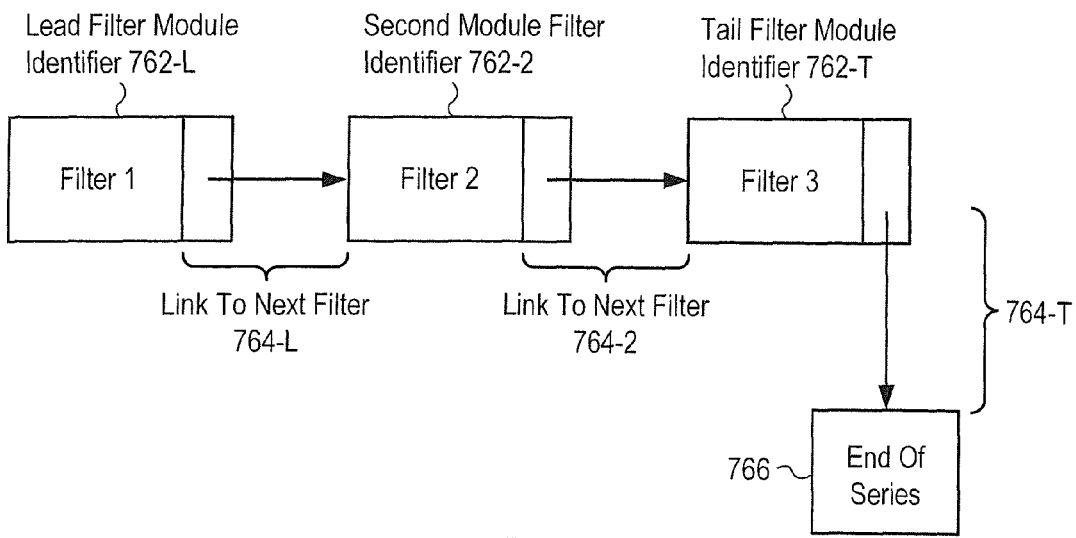
FIGS. 7A/B are block diagrams of examples of serial coupling structures before and after removal and addition of filter modules.

FIGS. 7A/B are block diagrams of examples of serial coupling structures 760 before and after removal and addition of filter modules. FIG. 7A illustrates a serial coupling structure 760A before removal and addition of filter modules. The serial coupling structure may represent a linked list or other similar type of data structure that is operable to specify or represent a sequence or series of filter modules. The serial coupling structure may specify both the identities of the filter modules and the serial coupling or order of the filter modules. In the illustrated example, the serial coupling structure represents a serial three-stage filter module, although the scope of the invention is not so limited. As shown, for each of the three stages, the structure may include a filter module identifier and a link or pointer to the next or subsequent filter module in the series. In particular, the first stage includes a lead filter module identifier 762-L that identifies a filter 1 and a first link or pointer 764-L to a second stage. The second stage includes a second filter module identifier 762-2 that identifies a filter 2 and a second link or pointer 764-2 to a third stage. The third stage includes a tail filter module identifier 762-T that identifies a filter 3, and since the third stage is the last/tail stage in this example, an optional third link 764-T to an end of series identifier 766. The end of series identifier is not required for other types of serial coupling structures.

Figure 7B:
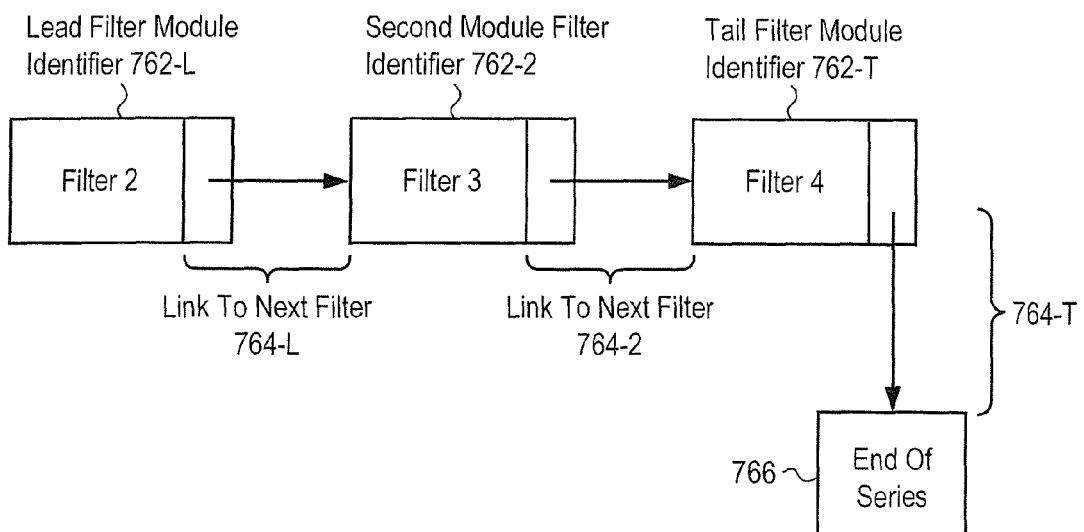

FIG. 7B illustrates a serial coupling structure 760B after removal of the lead filter module of FIG. 7A and after addition of a new tail filter module. The first stage includes a lead filter module identifier 762-L that identifies filter 2 and a first link or pointer 764-L to a second stage. The second stage includes a second filter module identifier 762-2 that identifies a filter 3 and a second link or pointer 764-2 to a third stage. The third stage includes a tail filter module identifier 762-T that identifies a filter 4, and since the third stage is the last/tail stage in this example, an optional third link or pointer 764-T to an end of series identifier 766. The end of series identifier is not required for other types of serial coupling structures. Notice that the filter 1 of FIG. 7A has been removed from the structure of FIG. 7B. Filter 2 is now the first filter module in the series instead of the second in the series, and filter 3 is the second in the series instead of the third/last. In addition, filter 4 has been added as the new tail filter module.

In some embodiments, addition and/or removal of filter modules, or changing the order of a series of filters more generally, may be achieved indirectly by operating on such serial coupling structures. In some embodiments, the filter modules and the association (e.g., serial coupling order) between the filter modules may be separately maintained through the use of the separate serial coupling structures. An indirection approach may be used to dynamically modify the sequence of the filter modules, for example, by adding a new filter at the beginning, removing a filter at the end, etc. Advantageously, this may help to reduce the amount of processing involved and/or the number of changes that need to be made to add and/or remove and/or reorder filter modules. The serial coupling structures may help to allow for efficient and uncomplicated addition and/or removal of filter modules from the start, tail, or any other positions in the sequence. For example, removing the lead filter module may involve passing initial input for a packet to the subsequent second filter module instead of to the lead filter module that is being removed. As another example, addition of a new tail filter module may involve taking output from the current tail filter module and linking or pointing it to an input of the new tail filter module. The order of the other filter modules does not need to be changed or reorganized. Moreover, changing the counters of the other filters is not required.

Figure 8:
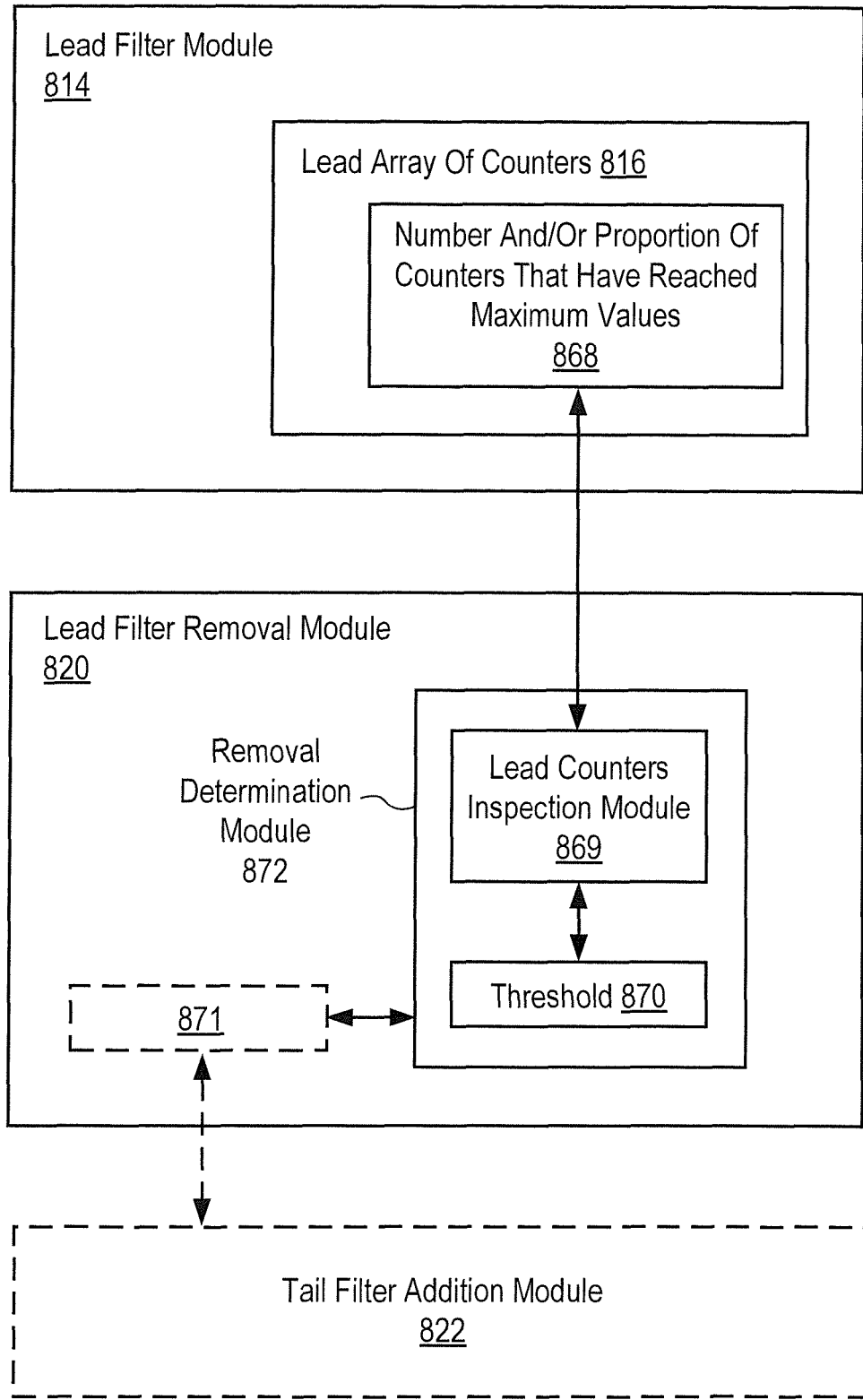
FIG. 8 is a block diagram of an embodiment of a lead filter removal module that is operable to remove a lead filter module based on a determination that a number or proportion of an array of counters of the lead filter module that have reached a maximum value has met a threshold.

FIG. 8 is a block diagram of an embodiment of a lead filter removal module 820 that is operable to remove a lead filter module 814 based on a determination that a number or proportion 868 of an array of counters 816 of the lead filter module that have reached a maximum value has met a threshold 870. The lead filter module has a lead array of counters 816. A proportion or number 868 of those counters have reached a maximum value and/or have overflown. The lead filter removal module includes a lead counters inspection module 869 that is operable to inspect the lead array of counters to determine the proportion or number of the counters that have reached the maximum value. This may be done in different ways, such as, for example, by examining the number of set status bits, by summing the counters, by determining the number of counters that are equal to the maximum value, etc. A removal determination module 872 may compare the proportion or number determined from inspection with a threshold 870 proportion or number. The threshold may represent a configurable, specifiable, or other predetermined number. If the proportion or number determined from inspection meets the threshold (e.g., is equal to or greater than the threshold), then the removal determination module may determine that the lead filter removal module should remove the lead filter module. This may help to provide a more accurate or effective way to determine when to remove filter modules, but is not required. Instead, for example, filter modules may be removed at periodic intervals or times, based on a total number of packets received, etc. In some embodiments, the lead filter removal module may optionally have a signaling module 871 to signal a tail filter addition module 822 that the lead filter module is to be removed, although this is not required. In one aspect, this help the tail filter addition module decide when to add a new tail filter module (e.g., to maintain a stead number of filter modules).

Figure 9:
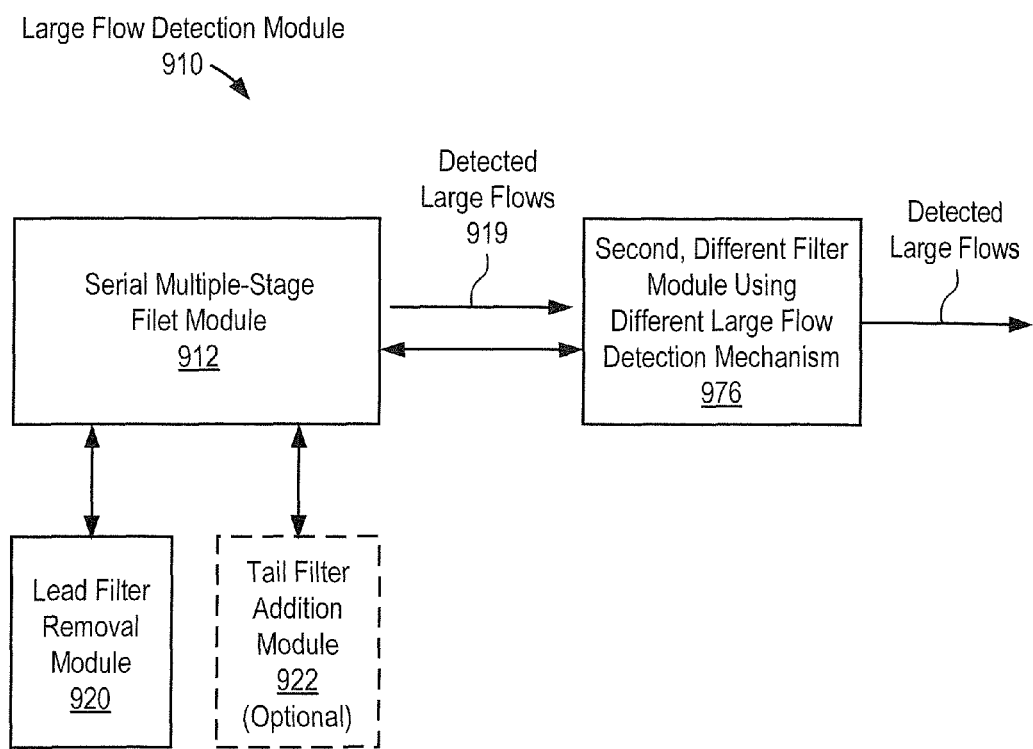
FIG. 9 is a block diagram of an embodiment of a large flow detection module that includes a serial multiple-stage filter module combined with a second, different type of filter module.

In some embodiments, the serial multiple-stage filter modules disclosed herein may be combined with one or more other different types of large flow detection mechanisms. FIG. 9 is a block diagram of an embodiment of a large flow detection module 910 that includes a serial multiple-stage filter module 912 combined with a second, different type of filter module 976. The serial multiple-stage filter module may be similar to or the same as those described elsewhere herein. As shown, in some embodiments, a lead filter removal module 920, and optionally a tail filter addition module 922, may optionally be coupled with the serial multiple-stage filter module, and may be operable to add and remove filter modules as described elsewhere herein.

The second, different type of filter module 976 is coupled with an output of the serial multiple stage filter module 912. The second filter module is operable to receive detected large flows 919 from the serial multiple stage filter module. The second filter module may be operable to use a different large flow detection mechanism than the serial multiple stage filter module. In some embodiments, the second filter module may be operable to perform approximation of a different dimension than the serial multiple stage filter module. For example, in some embodiments, rather than sharing counters among all flows, the second filter module may do approximation by using exact counters only for sampled flows. Since the second filter module and the serial multiple stage filter module may be operable to perform approximation of different dimensions, a combined system where both filters are used in conjunction may help to provide improved overall performance.

In some embodiments, the second filter module may include an elephant trap. The elephant trap may do relatively more extensive processing (e.g., insertion, update, aging, eviction) for monitored flows. In some embodiments, the detected large flows from the serial multiple-stage filter module may be used to insert flows to be monitored into the elephant trap. The detected large flows from the serial multiple-stage filter module may replace or supplant the random samples conventionally used for insertion into the elephant trap. Otherwise, aside from the input of the detected large flows into the elephant trap, it may operate substantially conventionally.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. Those skilled in the art will recognize that the invention can be practiced with modification and alteration within the spirit and scope of the appended claims. The description is thus to be regarded as illustrative instead of limiting. The scope of the invention is not to be determined by the specific examples provided above but only by the claims below.

In other instances, well-known circuits, structures, devices, and operations have been shown in block diagram form or without detail in order to avoid obscuring the understanding of the description. Further, where considered appropriate, reference numerals or terminal portions of reference numerals have been repeated among the figures to indicate corresponding or analogous elements, which may optionally have similar or the same characteristics.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Various operations and methods have been described. Some of the methods have been described in a basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc. The optional details described herein for an apparatus also optionally apply to the methods described herein which may in embodiments be performed by and/or with such an apparatus.

Different embodiments of the invention may be implemented using different combinations of software, firmware, and/or hardware. Thus, the techniques shown in the figures can be implemented using code and data stored and executed on one or more electronic devices (e.g., an end station, a network device).

An electronic device (e.g., a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware such as a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory machine-readable medium of a given electronic device typically stores instructions for execution on one or more processors of that electronic device.

What is claimed is:

1. A network device, the network device operable to be deployed in a network to receive packets of different flows, the network device operable to detect large flows of packets, the network device comprising:
    at least one card operable to receive the packets of the different flows from the network; and
    a large flow detection module including:
    a serial multiple-stage filter module including a plurality of filter modules coupled together in series, the plurality of filter modules including a lead filter module at a start of the series and a tail filter module at an end of the series, each of the filter modules including a plurality of counters, the serial multiple-stage filter module operable to serially increment the counters of the filter modules to reflect the packets of the different flows, in which the serial multiple-stage filter module is operable to increment counters that correspond to packets of flows of subsequent filter modules in the series only after all counters that correspond to the packets of the flows of all prior filter modules in the series have been incremented serially up to corresponding maximum values, and in which the serial multiple-stage filter module is operable to detect flows of packets that correspond to counters of the tail filter module that have been incremented up to corresponding maximum values as the large flows of packets; and
    a lead filter removal module coupled with the serial multiple-stage filter module, the lead filter removal module operable to remove the lead filter module from the start of the series.

2. The network device of claim 1, wherein the lead filter removal module is operable to remove the lead filter module during operation of at least one other filter module of the plurality.

3. The network device of claim 1, wherein the lead filter removal module is operable to remove the lead filter module based on a determination that a proportion of the counters of the lead filter module that have reached a maximum value has met a threshold level.

4. The network device of claim 1, wherein the lead filter removal module is operable to remove the lead filter module at a periodic interval.

5. The network device of claim 1, wherein the large flow detection module further comprises a tail filter addition module coupled with the serial multiple-stage filter module, the tail filter addition module operable to add a new tail filter module at the end of the series during operation of at least one other filter module of the plurality.

6. The network device of claim 4, wherein the tail filter addition module is operable to add the new tail filter module which has a greater number of counters than a number of counters of the lead filter module.

7. The network device of claim 4, wherein the tail filter addition module is operable to add a greater number of new filter modules to the serial multiple-stage filter module over a period of time than a number of lead filter modules removed from the serial multiple-stage filter module over the period of time to increase a total number of filter modules of the serial multiple state filter module.

8. The network device of claim 1, wherein the serial multiple-stage filter module is operable to serially increment the counters of the filter modules to reflect substantially all packets of all flows in-line and at link speed.

9. The network device of claim 1, wherein the serial multiple-stage filter module is operable to increment each of the counters of each of the filter modules to reflect packets of a plurality of different flows.

10. The network device of claim 1, wherein the serial multiple-stage filter module is operable to increment the counters of the filter modules based in part on sizes of the packets of the different flows.

11. The network device of claim 1, further comprising an additional filter module coupled with an output of the serial multiple-stage filter module, the additional filter module operable to receive indications of large flows detected by the serial multiple-stage filter module, the additional filter module operable to use a different large flow detection mechanism than the serial multiple-stage filter module.

12. The network device of claim 1, wherein each of the filter modules comprises:
an array of counters;
an array index generation module that is operable to use a corresponding function to generate an array index for a packet of a flow, the array index operable to identify a counter of the array of counters of the corresponding filter module; and
a counter increment module coupled with the array of counters and with the array index generation module of the corresponding filter module, the counter increment module operable to increment the identified counter of the corresponding filter module to reflect the packet of the flow only after all counters that correspond to the packet of the flow of all prior filter modules have reached corresponding maximum values.

13. A method, performed by a network device that is deployed in a network and that receives packets of different flows, the method one of detecting large flows of packets, the method comprising steps of:
receiving the packets of the different flows from the network at one or more cards of the network device;
serially incrementing counters at each of a series of counter stages to reflect the packets of the different flows, including at a lead counter stage at a start of the series, and at a tail counter stage at an end of the series, in which serially incrementing the counters includes incrementing counters that correspond to packets of flows of subsequent counter stages in the series only after serially incrementing all counters that correspond to the packets of the flows of all prior counter stages in the series up to corresponding maximum values;
detecting the large flows of packets as flows of packets that correspond to counters of the tail counter stage that have reached corresponding maximum values; and
removing the lead counter stage from the start of the series of counter stages.

14. The method of claim 13, wherein the step of removing comprises removing the lead counter stage during operation of one or more counter stages of the series.

15. The method of claim 13, further comprising a step of determining that a proportion of counters of the lead counter stage that have reached a corresponding maximum value has met a threshold, and wherein the step of removing comprises removing the lead counter stage based at least in part on the step of determining that the proportion has met the threshold.

16. The method of claim 13, further comprising a step of adding a tail counter stage at the end of the series during operation of one or more counter stages of the series.

17. The method of claim 16, wherein the step of adding comprises adding the tail counter stage which has a greater number of counters than a number of counters of the lead counter stage.

18. The method of claim 16, further comprising a step of increasing a total number of counter stages by more than one over a period of time by adding a greater number of counter stages over the period of time than a number of counter stages removed over the period of time.

19. The method of claim 13, wherein the step of serially incrementing comprises serially incrementing the counters at each of the series of counter stages to reflect substantially all packets of all flows in-line and at link speed.

20. The method of claim 13, wherein the step of serially incrementing comprises serially incrementing the counters based in part on sizes of the packets of the flows.

21. An edge router device, the edge router device operable to be deployed at an edge of an OpenFlow network to receive packets of different flows, the edge router device operable to detect large flows of packets, the edge router device comprising:
at least one card operable to receive the packets of the different flows from the OpenFlow network; and
a large flow detection module including:
a serial multiple-stage filter module including a plurality of filter modules coupled together in series, the plurality of filter modules including a lead filter module at a start of the series and a tail filter module at an end of the series, each of the filter modules including a plurality of counters, the serial multiple-stage filter module operable to serially increment the counters of the filter modules to reflect substantially all of the packets of the different flows in-line and at link speed, in which the serial multiple-stage filter module is operable to increment counters that correspond to packets of flows of subsequent filter modules in the series only after all counters that correspond to the packets of the flows of all prior filter modules in the series have been incremented serially up to corresponding maximum values, and in which the serial multiple-stage filter module is operable to detect flows of packets that correspond to counters of the tail filter module that have been incremented up to corresponding maximum values as the large flows of packets;

a lead filter removal module coupled with the serial multiple-stage filter module, the lead filter removal module operable to remove the lead filter module from the start of the series during operation of at least one other filter module of the plurality; and a tail filter addition module coupled with the serial multiple-stage filter module, the tail filter addition module operable to add a new tail filter module at the end of the series during operation of at least one other filter module of the plurality.

22. A method, performed by an edge router device that is deployed at an edge of an OpenFlow network and that receives packets of different flows, the method one of detecting large flows of packets, the method comprising steps of:

receiving the packets of the different flows from the OpenFlow network at one or more cards of the network device;

serially incrementing counters at each of a series of counter stages to reflect substantially all of the packets of the different flows in-line and at link speed, including at a lead counter stage at a start of the series, and at a tail counter stage at an end of the series, in which serially incrementing the counters includes incrementing counters that correspond to packets of flows of subsequent counter stages in the series only after serially incrementing all counters that correspond to the packets of the flows of all prior counter stages in the series up to corresponding maximum values;

detecting the large flows of packets as flows of packets that correspond to counters of the tail counter stage that have reached corresponding maximum values;

removing the lead counter stage from the start of the series of counter stages during operation of at least one other counter stage of the series of counter stages; and adding a new tail counter stage at the end of the series of counter stages during operation of at least one other counter stage of the series of counter stages.

* * * * *

UNITED STATES PATENT AND TRADEMARK OFFICE
CERTIFICATE OF CORRECTION

PATENT NO. : 9,118,567 B2  
APPLICATION NO. : 13/942566  
DATED : August 25, 2015  
INVENTOR(S) : Bisht et al.

Page 1 of 1

It is certified that error appears in the above-identified patent and that said Letters Patent is hereby corrected as shown below:

On the title page item (71), delete "TELEFONAKITIEBOLAGET" and insert -- TELEFONAKTIEBOLAGET --, therefor.

In the drawings

Fig. 9, Sheet 9 of 9, in Box "912", delete "Filet" and insert -- Filter --, therefor.

In the specification

Column 14, Line 44, delete "entries)" and insert -- entries --, therefor.

Signed and Sealed this  
Twelfth Day of April, 2016

Michelle K. Lee  
*Director of the United States Patent and Trademark Office*